United States Patent
Grandi et al.

(10) Patent No.: US 11,346,307 B2
(45) Date of Patent: May 31, 2022

(54) FLUID INJECTOR AND NEEDLE FOR A FLUID INJECTOR

(71) Applicant: CPT Group GmbH, Hannover (DE)

(72) Inventors: Mauro Grandi, Leghorn (IT); Michael J. Hornby, Williamsburg, VA (US); Valerio Polidori, Leghorn (IT)

(73) Assignee: VITESCO TECHNOLOGIES GMBH, Hanover (DE)

(*) Notice: Subject to any disclaimer, the term of this patent is extended or adjusted under 35 U.S.C. 154(b) by 281 days.

(21) Appl. No.: 16/328,847

(22) PCT Filed: Aug. 22, 2017

(86) PCT No.: PCT/EP2017/071173
§ 371 (c)(1),
(2) Date: Feb. 27, 2019

(87) PCT Pub. No.: WO2018/041681
PCT Pub. Date: Mar. 8, 2018

(65) Prior Publication Data
US 2019/0186419 A1    Jun. 20, 2019

(30) Foreign Application Priority Data

Aug. 31, 2016 (EP) ..................................... 16186607

(51) Int. Cl.
*F02M 21/02* (2006.01)
*F02M 61/08* (2006.01)

(52) U.S. Cl.
CPC .... *F02M 21/0266* (2013.01); *F02M 21/0215* (2013.01); *F02M 21/0272* (2013.01);
(Continued)

(58) Field of Classification Search
CPC .......... F02M 21/0266; F02M 21/0272; F02M 21/0215; F02M 21/0275; F02M 61/08;
(Continued)

(56) References Cited

U.S. PATENT DOCUMENTS

| 5,950,930 A | * | 9/1999 | Potz | ................... F02M 61/1806 239/533.4 |
| 6,827,297 B2 | | 12/2004 | Hockenberger | ......... 239/533.12 |
| 2012/0115060 A1 | | 5/2012 | Stier et al. | ..................... 429/444 |

FOREIGN PATENT DOCUMENTS

| CN | 1383470 A | 12/2002 | ............. F02M 61/04 |
| CN | 101529079 A | 9/2009 | ............. F02M 47/02 |

(Continued)

OTHER PUBLICATIONS

Extended European Search Report, Application No. 16186607.4, 7 pages, dated Feb. 10, 2017.
(Continued)

*Primary Examiner* — Qingzhang Zhou
(74) *Attorney, Agent, or Firm* — Slayden Grubert Beard PLLC (57) ABSTRACT

Various embodiments include a fluid injector comprising: an injector housing defining a fluid path; a needle within the housing and movable to a closed position and an open position. The needle comprises two axial ends, an end face on the second, and an axial needle section surrounded by the housing. Between the axial section and the surrounding housing, there is a gap comprising at least part of the fluid path. The needle includes a hole extending from the end face and a connecting hole providing fluid connection between the hole and the gap. The valve also includes a plate defining a through-hole. A first valve seat is defined at a surface of the plate facing the end face and adjoining the through-hole and when the needle is in the closed position the through-hole is closed by the end face.

14 Claims, 8 Drawing Sheets

(52) U.S. Cl.
CPC ........ F02M 21/0275 (2013.01); F02M 61/08 (2013.01); *Y02T 10/30* (2013.01)

(58) Field of Classification Search
CPC ............... F02M 61/205; F02M 61/165; F02M 2200/315; F02M 2200/8092; F02M 2200/28; F02M 2200/505; F02M 61/168; F02M 55/04; Y02T 10/30
See application file for complete search history.

(56) References Cited

FOREIGN PATENT DOCUMENTS

| | | | | |
|---|---|---|---|---|
| CN | 101676549 A | 3/2010 | ............. | F02M 47/02 |
| DE | 103 19 920 A1 | 5/2004 | ............. | F02M 51/06 |
| DE | 10319920 A1 * | 5/2004 | | |
| DE | 10 2013 222 030 A1 | 4/2015 | ............. | F02M 21/02 |
| EP | 1801410 A1 | 6/2007 | ............. | F02M 51/06 |
| EP | 1 561 027 B1 | 3/2008 | ............. | F02M 51/06 |
| JP | 2000-230467 A | 8/2000 | ............. | F02M 61/10 |
| JP | 2006-125202 A | 5/2006 | ............. | F02M 61/10 |
| KR | 101033080 B1 | 5/2011 | ............. | F02M 51/06 |
| WO | 2016/162194 A1 | 10/2016 | ............. | F02M 21/02 |
| WO | 2018/041681 A1 | 3/2018 | ............. | F02M 21/02 |

OTHER PUBLICATIONS

International Search Report and Written Opinion, Application No. PCT/EP2017/071173, 11 pages, dated Sep. 15, 2017.
Korean Office Action, Application No. 20197009109, 13 pages, dated Mar. 16, 2020.
Korean Notice of Allowance, Application No. 2020069489824, 3 pages, dated Oct. 8, 2020.
European Office Action, Application No. 17757527.1, 5 pages, dated Nov. 12, 2020.
Chinese Office Action, Application No. 201780053504.1, 15 pages, dated Aug. 31, 2020.

* cited by examiner

PRIOR ART

FLUID INJECTOR AND NEEDLE FOR A FLUID INJECTOR

CROSS-REFERENCE TO RELATED APPLICATIONS

This application is a U.S. National Stage Application of International Application No. PCT/EP2017/071173 filed Aug. 22, 2017, which designates the United States of America, and claims priority to EP Application No. 16186607.4 filed Aug. 31, 2016, the contents of which are hereby incorporated by reference in their entirety.

TECHNICAL FIELD

The present disclosure relates to internal combustion engines. Various embodiments may include a fluid injector for direct injection (DI) or for multi point injection (MPI) of compressed natural gas (CNG) into a combustion chamber of a combustion engine.

BACKGROUND injection valves are in wide spread use, in particular for combustion engines where they may be arranged in order to dose a fluid, especially compressed natural gas (CNG). In the state of the art there are known fluid injectors as shown by FIGS. 4, 5, 5a, and 5b in the following. These fluid injectors include an inward valve (i. e. a valve of the inward opening type) which is actuated by an electromagnetic actuator unit. When de-energized, a needle is moved axially in an outward direction by means of compressed spring towards a closing position where the valve is closed. On the other hand, when energized the actuator unit applies an electromagnetic attracting force to the needle in an axial direction by exceeding the force of the spring so that the needle is moved towards its opening position so that the valve is opened.

Figure 4:
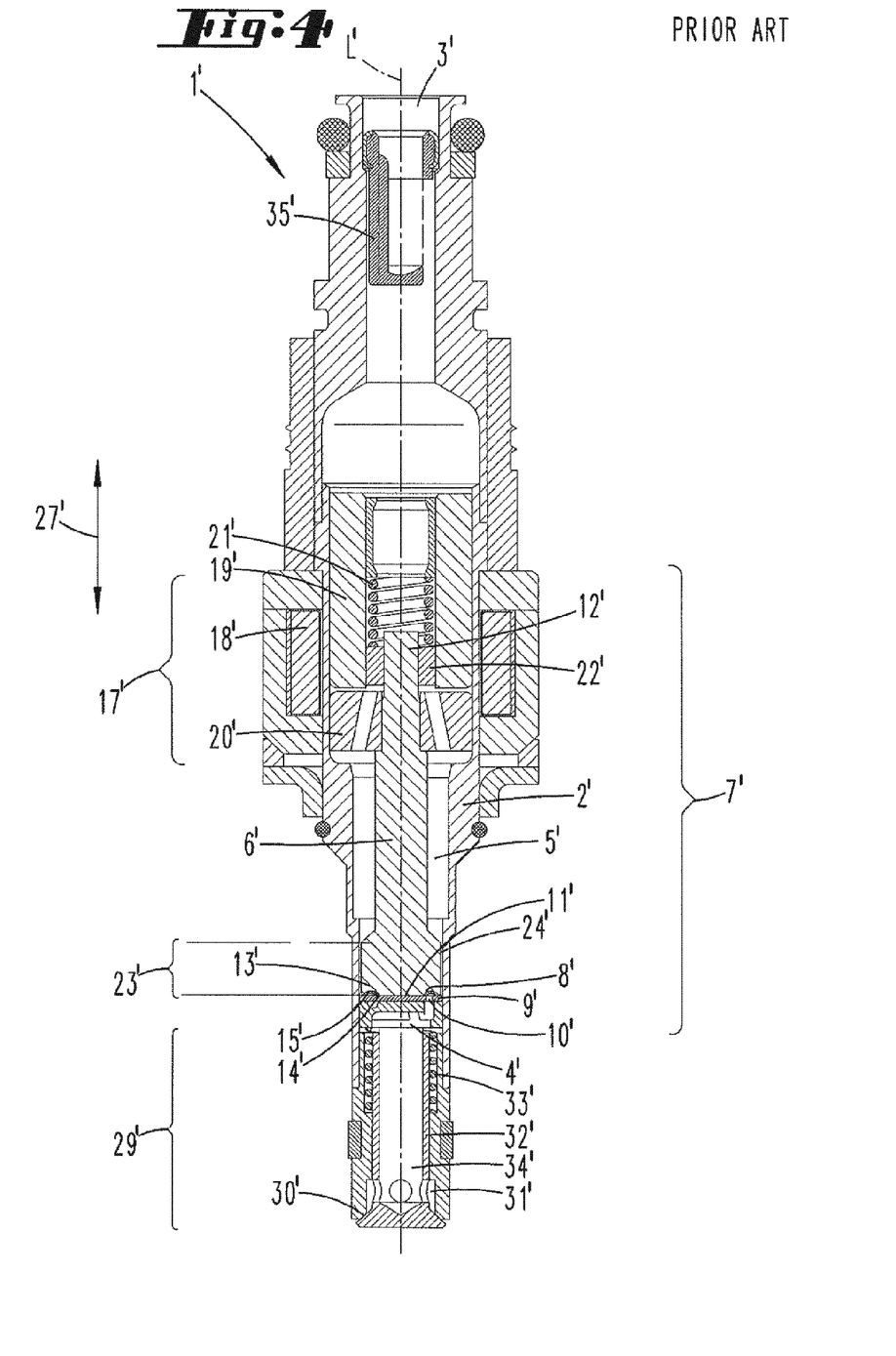
FIG. 4 is a schematic longitudinal sectional view of a fluid injector known from the prior art for direct injection, shown in the closed valve state.
Figure 5:
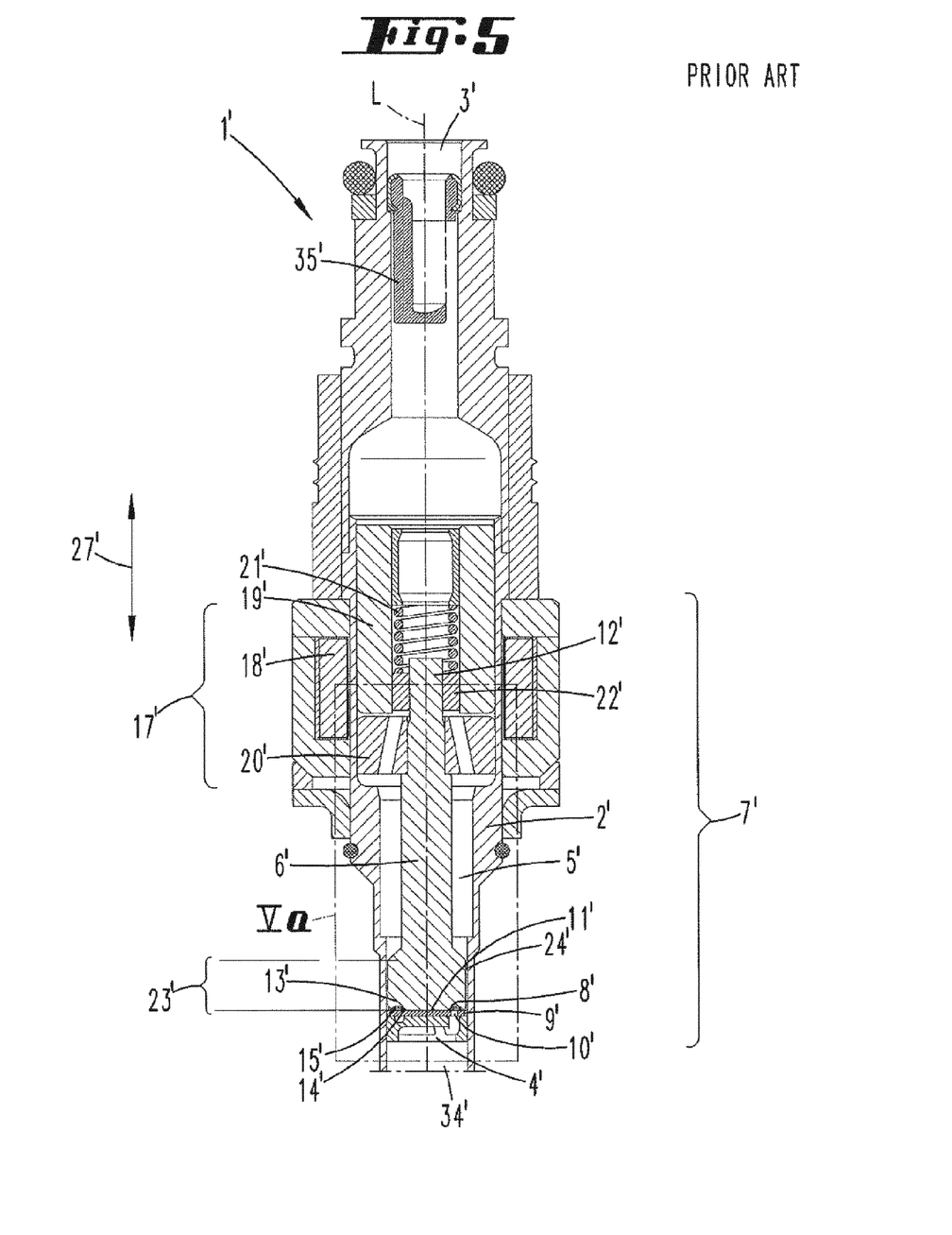
FIG. 5 is a schematic longitudinal sectional view of a second fluid injector of the prior art, shown in its closed valve state.

FIG. 5 shows a known fluid injector which can be used for injection of compressed natural gas (CNG) by a so-called multipoint injection (MPI). In FIG. 4 it is shown a similar fluid injector which can be used for injection of compressed natural gas (CNG) by direct injection (DI). The difference is that the fluid injector shown by FIG. 4 in addition to the valve described above furthermore includes a second valve, which is a passive valve downstream to the above described valve. Both known fluid injectors include the above inward valve which has a double function.

A first function is to guarantee the right quantity of an intended mass flow to the combustion chamber for an MPI application and to the passive vale in the DI application. The second function is to seal the injector tip for avoiding an external leakage of an injected fluid by use of a special rubber. The actuator unit includes a pole piece, an armature and a coil to be energized by an electrical voltage. The distance between the armature and the pole piece corresponds to a certain needle lift.

Figure 5A:
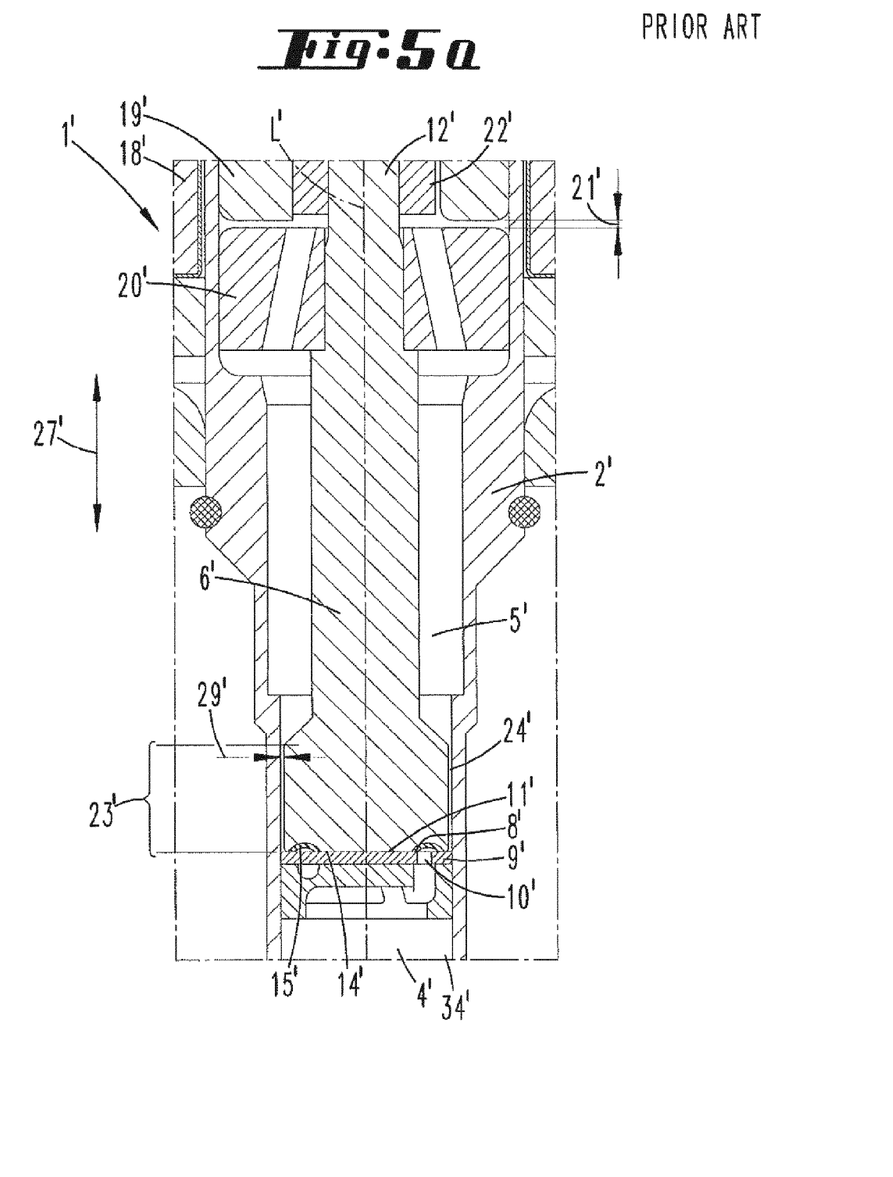
FIG. 5a is an enlarged view of detail Va, shown in FIG. 5.
Figure 5B:
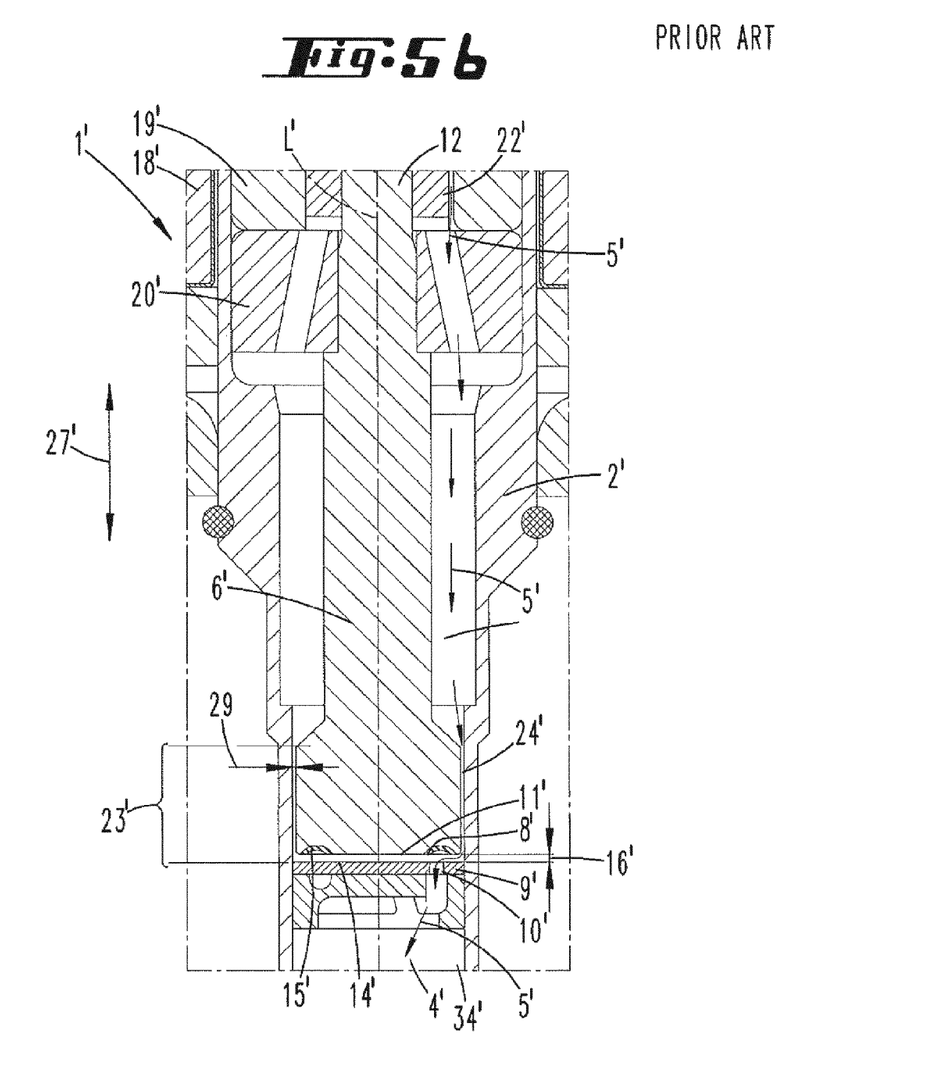
FIG. 5b is an enlarged view of the components shown by FIG. 5a, however representing the opened valve state.

When the solenoid is energized, the armature is attracted by the pole piece, and the needle opens the inward valve as shown by FIG. 5b. The fluid goes through the valve by passing from the outside of the actuator (needle-armature) and due to the architecture shown by FIGS. 4, 5, 5a, and 5b the quantity of mass flow flowing out of the valve is defined by the passage given by the needle lift as shown by the fluid path indicated in FIG. 5b schematically by arrows. The needle lift corresponds to the axial moving interval including at its ends the closing position and the opening position of the needle. For a number of reasons, it is advantageous if the needle lift is small. However, decreasing the determined needle lift also decreases the cross section of opening which is available for the fluid to pass through the valve in the opening state.

Considering that the needle lift is the "bottle neck" it has been already tried to increase the value of the needle lift in order to enable or even to guarantee the passing of a certain mass flow of a fluid which is necessary for certain applications. However, due to the used architecture by increasing the needle lift also the distance between the armature and the pole piece has been increased with the consequence of decreasing the injector's performances, like operative pressure range and minimum controllable mass. Furthermore, an increased needle lift also increases the impact energy generated on reaching both the opening position and the closing position.

For these reasons increasing the needle lift requires additional efforts in order to avoid limits in the injector application occurring otherwise. Regarding fluid injectors used for injecting gaseous fuel fluids like for example compressed natural gas (CNG) the above described problems are of special importance because gases have a smaller density compared to liquids. For this reason, on injecting gases it is often necessary to dose bigger volumes if compared to liquid fuels.

SUMMARY

The teachings of the present disclosure describe a fluid injector, in particular for injecting compressed natural gas (CNG) with an improved needle for such a fluid injector. In some embodiments, a fluid injector and a needle for a fluid injector enable a mass flow of a fluid, especially of a gas, which is bigger compared to the mass flow through conventional fluid injectors as described above and may guarantee an intended quantity of such an increased mass flow.

For example, some embodiments include a fluid injector comprising:
an injector housing including a fluid path wherein said fluid path extends along a longitudinal direction from an injector inlet to an injector outlet, and
a needle which is housed within the injector housing and which is axially movable relative to the injector housing in a moving interval including a closing position and an opening position of the needle, wherein the needle comprises a first axial end and a second axial end of which the second axial end is closer to the injector outlet and comprises an end face, wherein the needle comprises at least an axial needle section which (regardless of which moving position the needle has in the moving interval) is circumferentially surrounded by the injector housing, wherein (radially) between said axial needle section and the surrounding injector housing there is at least one (axially extending) gap, which belongs to said fluid path, wherein the needle includes a blind hole which extends from the end face of the second axial end of the needle and wherein the needle includes at least one connecting hole extending either transversely, in particular orthogonally, to a geometric longitudinal central axis of the needle or in an angular way to a geometric longitudinal central axis of the needle, wherein the blind hole is in fluid connection to said gap by means of the at least one connecting hole. In some embodiments, the at least one connecting hole opens out into the axial needle section at its end remote from the blind bore. In some embodiments, the axial needle section extends axially to the end face at the second axial end of the needle.

BRIEF DESCRIPTION OF THE DRAWINGS

Exemplary embodiments of the teachings herein and fluid injectors known in the prior art will now be described with reference to the accompanying drawings. These are as follows.

DETAILED DESCRIPTION OF THE DRAWINGS

Together with the gap between the axial needle section and the surrounding injector housing, the blind bore and one or more connecting holes provide a double passage area for the gas to reach the seat through the gap from outside the needle and through the hole and the blind bore from the inner of the needle. The total cross-section which can be passed through by the fluid is increased compared to the cross-section of only the gap. A needle with a central blind hole, fed by one or more connecting holes, which in particular extends or extend in a radial direction, allows an increasing of the passage section given by a lift of the needle in its opening position. In this way, the first valve seat can be fed from the outside and from the inside of the needle. The increasing of the passage section does not require an increasing of the distance between the armature and the pole piece in the opening position of the needle to enable or to guarantee the injection of a required amount of fluid (mass) flow.

There are many possibilities for performing preferred modifications:

In some embodiments, the fluid injector includes a plate comprising at least one through-hole, wherein the plate is sealingly connected along its outer edge to an inside of the injector housing. A first valve seat is provided at a surface of the plate, faces the end face at the second end of the needle and adjoins, in particular surrounds, said through-hole. The plate may, thus, also be called a "seat plate". When the needle is in the closing position, the through-hole is sealingly closed by the end face of the needle or by a sealing which is fixed to the end face of the needle. In some embodiments, the surface of the plate being provided with the valve seat may be generally flat, in particular with a main extension direction perpendicular to the longitudinal direction. Correspondingly, the end face of the needle may also be a generally flat surface, extending perpendicular to the longitudinal direction. In some embodiments, the end face of the needle and the surface of the plate are coplanar. "Generally flat" in this context means in particular that the end face may comprise one or more—e.g. ring shaped—protrusions as sealing elements or one or more recesses for accommodating the sealing. The sealing is in particular an elastomeric seal such as a rubber seal.

In some embodiments, when the needle is in its closing position the at least one through-hole is closed by means of the end face or by means of a sealing attached to the end face. The double passage area or multiple passage area provided by the gap together with the blind-hole and the one or more connecting holes enables the gas to reach the first valve seat from at least two directions, like from an inner and from an outer direction.

In some embodiments, the plate may include a number of through-holes, for example distributed along a circular line and the first valve seat may extend along a first circumference inside to the position of the through-holes and along a second circumference outside to the position of the through-holes.

In some embodiments, the fluid injector comprises a first valve assembly including said needle and a first valve seat, wherein the first valve assembly is of the inward opening type.

In some embodiments, the axial needle section and an axial end of the gap adjoin the end face.

In some embodiments, the blind hole it is formed centrally in the needle. In some embodiments, the blind hole may extend parallel and in particular concentrically to a geometric longitudinal central axis of the needle. In some embodiments, the connecting hole extends radially to a centerline of the blind hole and in particular radially to the longitudinal axis.

In some embodiments, a number of, in particular four, connecting holes are formed in the needle, in particular close to the second axial end, wherein the connecting holes are evenly distributed along a circumferential direction and wherein the blind hole is in fluid connection to said gap by means of each one of the connecting holes.

In some embodiments, a diameter of the blind hole and a diameter of the connecting hole or the connection holes is bigger compared to a radial width of the gap and/or is bigger compared to the axial moving interval of the needle.

In some embodiments, the fluid injector includes a spring which is adapted for applying a force to the needle towards its closing position. In some embodiments, the first valve assembly includes an electrical actuator unit being adapted to actuate the needle of the first valve assembly towards the opening position of the needle when the electrical actuator unit being energized, wherein the actuator unit in particular is of the piezo type or is an electromagnetic actuator unit. In some embodiments, the electromagnetic actuator unit includes a coil, a pole piece and an armature, wherein the coil and the pole piece are axially fixed to the housing and wherein the armature is axially fixed to the needle so that in the closing position of the needle an axial gap is formed between the armature and the pole piece and so that in the opening position of the needle the armature contacts the pole piece.

In some embodiments, in particular regarding applications for multipoint injection (MPI) the fluid injector includes a second valve assembly which is mounted between the first valve assembly and the injector outlet, wherein in particular the second valve assembly is of the outward opening type and/or is a passive valve assembly. A passive valve assembly means a valve assembly which is actuated by the pressure level in an adjacent valve chamber depending on the state of the first valve assembly. The second valve assembly may comprise a second valve seat which adjoins a or at least one through-hole and a closing member which is housed within the injector housing and which is axially movable relative to the injector housing in a moving interval including a closing position and an opening position of the closing member, so that when the closing member is in its closing position the through-hole is or the through-holes are sealingly closed by the closing member and when the closing member is in its opening position the through-hole is or the through-holes are opened. The second valve assembly may include a second spring for applying a force to the closing member towards its closing position. The second valve assembly may be adapted to that its moving member is moved in an outside direction to its opening position when the fluid pressure in the valve chamber exceeds a threshold value so that the force of the spring is exceeded.

In some embodiments, a needle for a fluid injector, in particular for a fluid injector of the above-mentioned generic type, may comprise a first axial end a second axial end. In some embodiments, the needle includes a blind hole which extends from an end face of the second axial end of the needle and that the needle includes at least one connecting hole extending either orthogonally to a longitudinal direction of the needle or in an angular way to the longitudinal direction of the needle, wherein the blind hole and the connecting hole are connected to each other.

Figure 1:
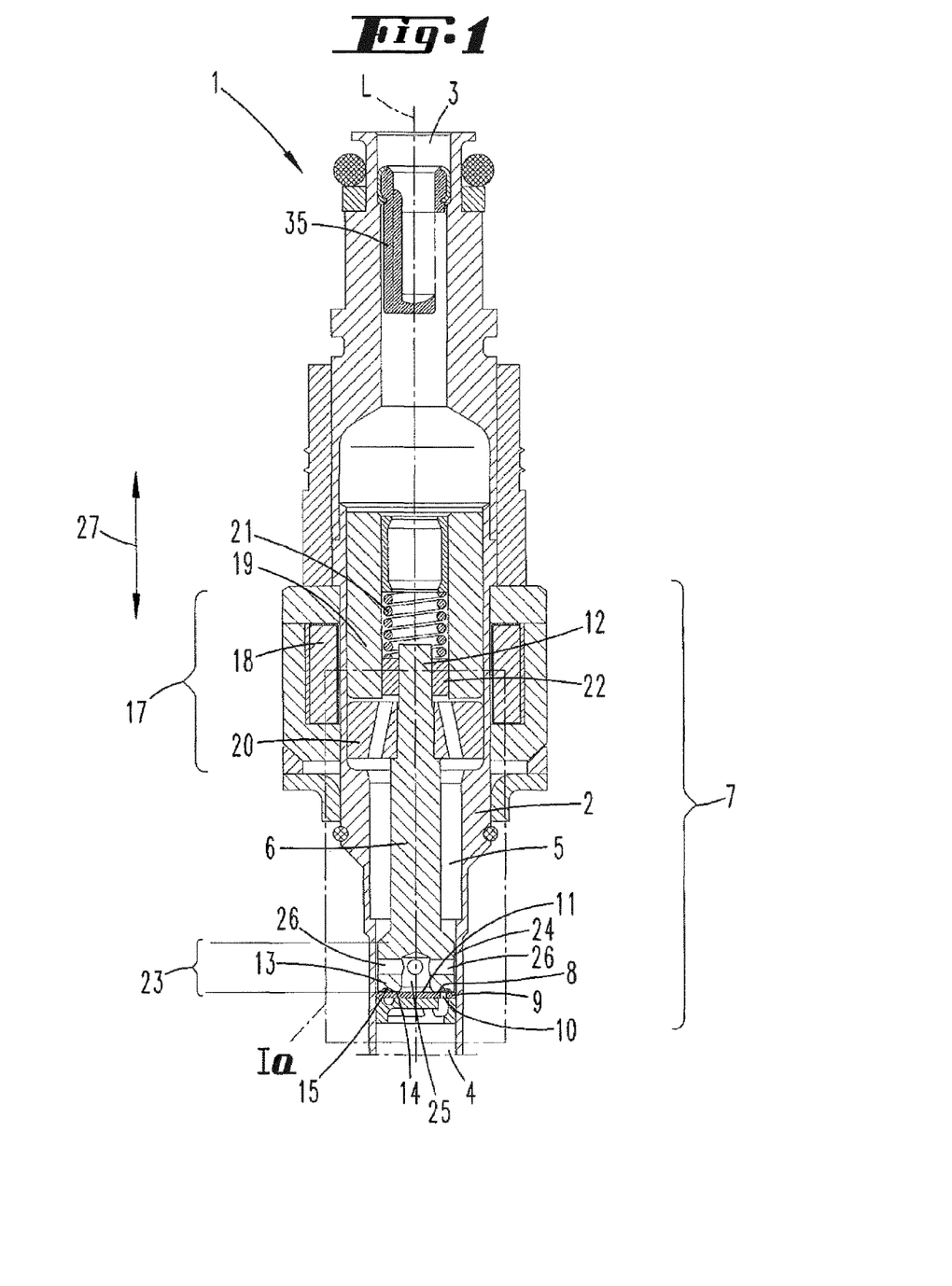
FIG. 1 is a schematic longitudinal sectional view of an inventive fluid injector incorporating teachings of the present disclosure.
Figure 2:
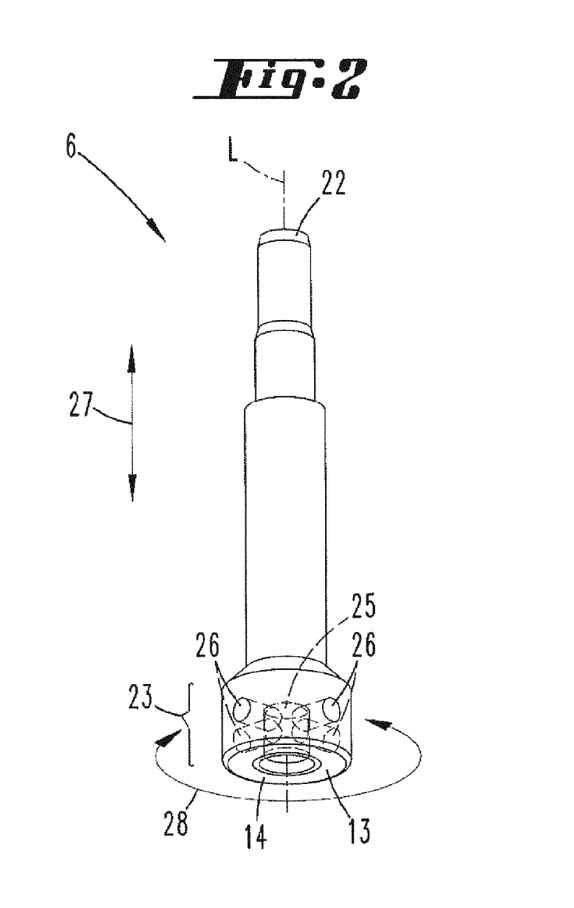
FIG. 2 is a perspective view of a needle incorporating teachings of the present disclosure.
Figure 3:
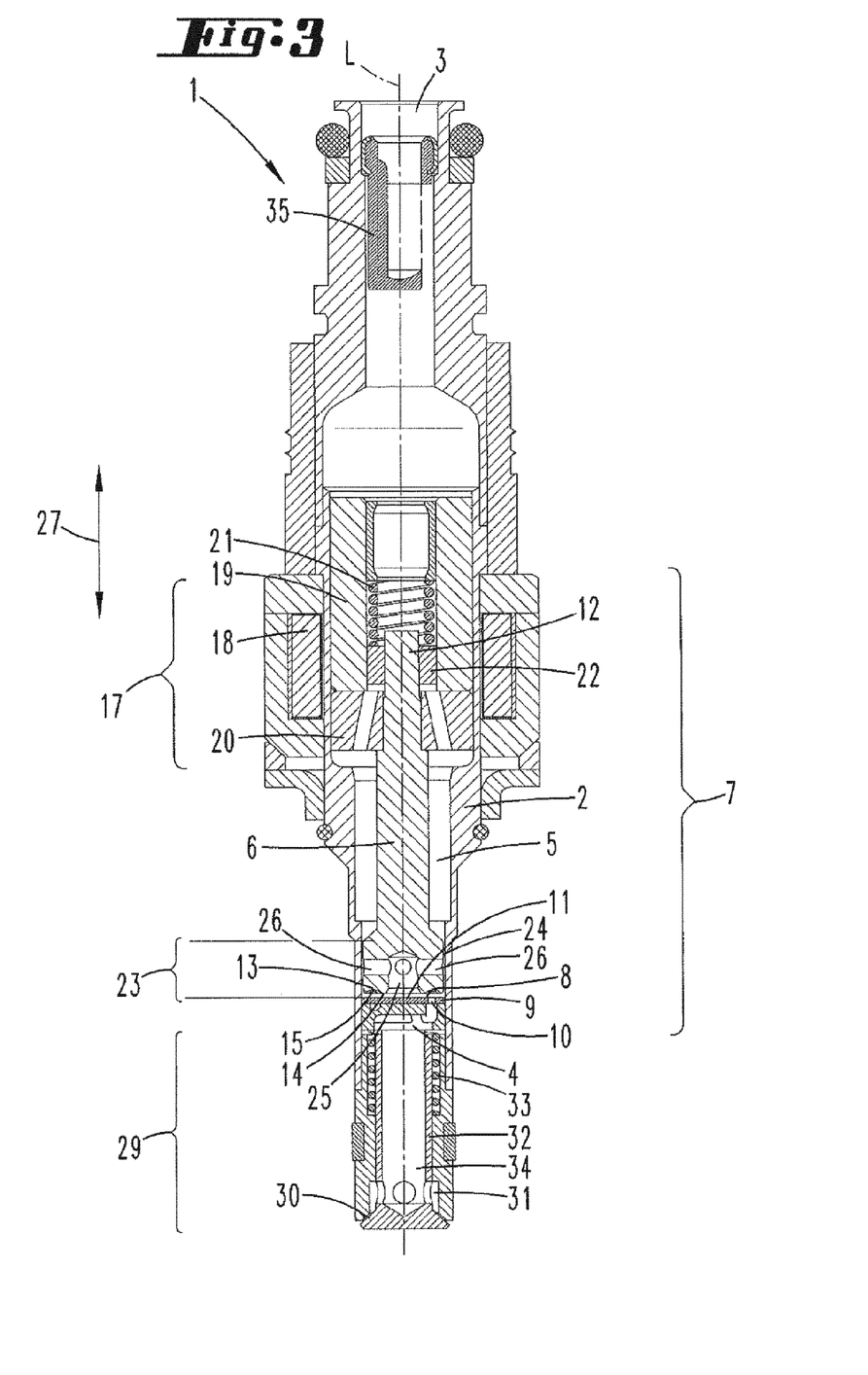
FIG. 3 is a schematic longitudinal sectional view of an inventive fluid injector incorporating teachings of the present disclosure shown in the opened valve state.

In the FIGS. 1-3 corresponding or similar elements appearing in different illustration are identified by the same reference numbers. In the FIGS. 4-5b corresponding or similar elements are identified by corresponding reference numbers however added by an "'".

In some embodiments, the fluid injector 1 can be used for injection of compressed natural gas (CNG) into a combustion chamber of a combustion engine (not shown in the figures), e.g. by multi point injection (MPI). It includes an injector housing 2 having an injector inlet 3 and an injector outlet 4 which are in fluid connection by a fluid path 5 which is shown in part by arrows in FIG. 1b. A filter 35 is mounted at the injector inlet 3.

A needle 6 is housed within the injector housing 2 and is axially moveable relative to the injector housing 2 in a moving interval parallel to a geometric longitudinal central axis L. The axial moving interval includes a position of the needle 6 in its closing position shown by FIG. 1a and the position of the needle 6 in its opening position shown by FIG. 1b and all positions of the needle 6 between these two positions. Needle 6 is a component of a first valve assembly 7 which valve assembly 7 further includes a first valve seat 8 (see also FIGS. 1a and 1b) and is of the inward opening type.

In some embodiments, the fluid injector 1 includes a plate 9 including a through-hole 10. The plate 9 is sealingly connected along its outer edge to an inside of the injector housing 2. The first valve seat 8 is provided at a surface 11 of the plate 9 facing the needle 6.

Figure 1A:
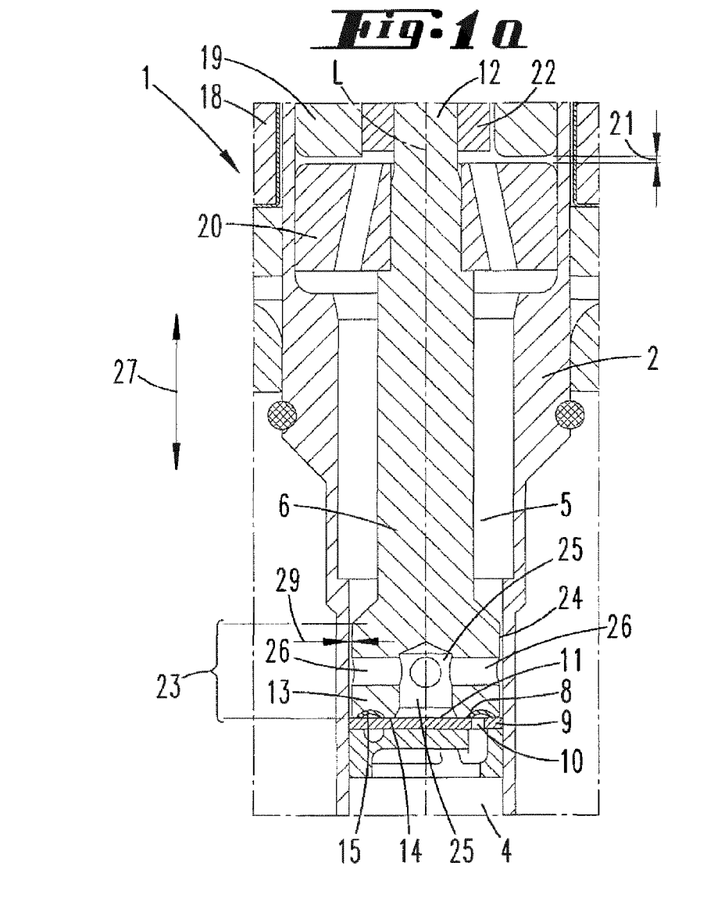
FIG. 1a is an enlarged view of detail Ia shown in FIG. 1 and representing a closed valve state.

In some embodiments, the needle 6 comprises a first axial end 12 and a second axial end 13 of which the second axial end 13 is closer to the injector outlet 4 and comprises an end face 14. At the end face 14 it is fixed a sealing 15. Surface 11 faces the end face 14 and the sealing is adapted to sealingly close the through-hole 10 when the needle 6 is in its closing position as shown by FIG. 1a. In this operation state the fluid path is closed by the first valve assembly 7. Otherwise, if the needle 6 is away from its closing position (i.e. in the opening position or in a position between the closing position and the opening position) an axial gap 16 occurs and if the sealing 15 does not contact the plate 9 the fluid path is opened at the second valve assembly 7.

In some embodiments, the first valve assembly 7 includes an electrical actuator unit 17 which is operable to actuate the needle 6 towards its opening position in order to open the first valve assembly 7. The actuator unit 17 includes a coil 18, a pole piece and an armature 20. These components can be made in a conventional way known to a skilled person in order to provide an electromagnetic actuator. In some embodiments, these components can be made of metal.

When the coil 18 which partly surrounds pole piece 19 and armature 20 is energized by electric current an electromagnetic attracting force is generated between the pole piece 19 and the armature 20. The coil 18 and the pole piece 19 are axially fixed to the injector housing 2 which means that no relative movement in an axial direction (i.e. parallel to the longitudinal axis L) is possible between the injector housing 2 and the coil 18 and pole piece 19 respectively.

In some embodiments, the armature 20 is axially fixed to the needle 6 which means that no axial relative movement is possible between the armature 20 and the needle 6. Armature 20 is fixed to the needle 6 at an appropriate axial position so that in the closing position of the needle 6 wherein the needle 6 and/or the sealing contacts the first valve seat 8 an axial gap 21 is formed between the armature 20 and the pole piece 19 and so that in the opening position of the needle wherein an axial gap 16 exists between the first valve seat 8 and the needle 6 and/or the sealing 15 consequently the armature 20 contacts the pole piece 19.

In some embodiments, the first valve assembly 7 includes a spring 21 which is adapted for applying a spring force to the needle 6 towards the closing position of the needle 6. In the example the spring 21 is a helical spring. In the example a ring-like support element 22 is axially fixed at the needle 6 close to its first axial end 12. Spring 12 is inserted axially between a component fixed at the injector housing 2 in order to apply a compressive force in an axial direction to the needle 6 by means of the support element 22.

The compression force is directed towards the closing position of the needle 6. In an operating state when the coil 18 is not energized the compressive force applied by the spring 21 effects that the needle 6 is moved to its closing position as shown by FIG. 1a. Otherwise, if the coil 18 is energized by electrical current (respective means for applying and for switching on or off an electric current are known so a skilled person and hence are not shown by the figures) an electromagnetic attraction force is generated between the pole piece 19 and the armature 20. When the electromagnetic force exceeds a certain threshold value this results in that the needle 6 is moved to its opening position as shown by FIG. 1b.

Figure 1B:
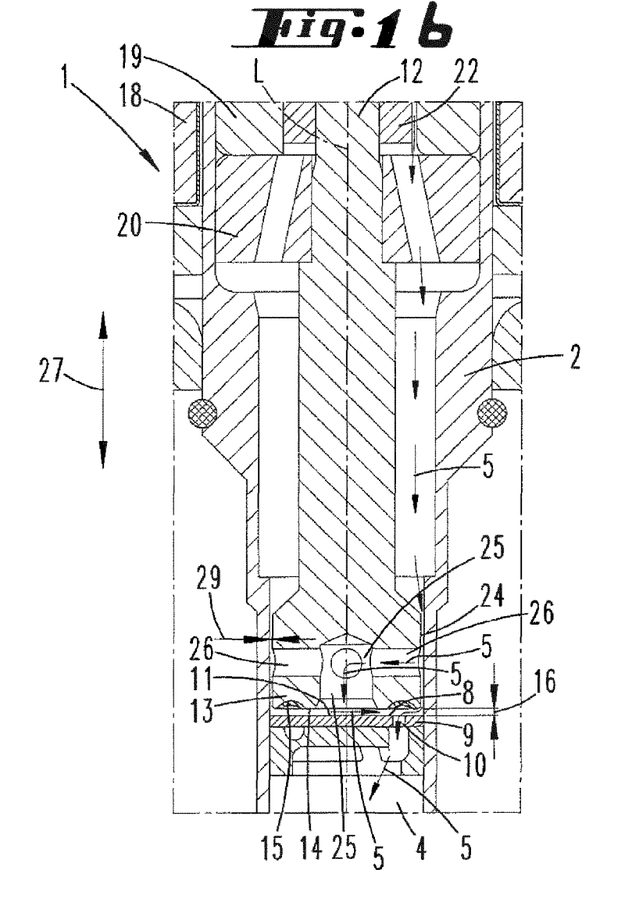
FIG. 1b is a similar enlarged view of the components of FIG. 1a, however representing an opened valve state.

As also shown by FIG. 1a, 1b the needle 6 comprises at least an axial needle section 23 which (regardless of which moving position the needle 6 has in the moving interval at a considered moment) is circumferentially surrounded by the injector housing 2 wherein between the axial needle section 23 and the surrounding injector housing 2 it is formed a gap 24 which belongs to the fluid path 5 (see FIG. 1b).

In some embodiments, the needle 6 includes a blind hole 25 which extends from the end face 14 of the second axial end 13 of the needle 6. Furthermore, in the example the needle 6 includes four connecting holes 26. Each of the connecting holes 26 extends radially to the central longitudinal axis L of the needle 6. By means of each of the connecting holes 26 the blind hole 25 is in fluid connection with the gap 24. In the example the gap 24 has a cylindrical shape and surrounds the axial needle section 23. As shown by FIG. 1, the axial needle section 23 adjoins to the second axial end 13 of the needle 6.

In some embodiments, the axial needle section 23 and an axial end of the gap 24 adjoin the end face 14. In the example, the blind hole 25 is formed centrally in the needle and extends concentrically to the longitudinal central axis L of the needle 6. As shown by FIG. 2, which represents the needle 6 also shown by FIG. 1, the connecting holes 26 are evenly distributed along a circumferential direction 28 which means that in the example the center lines of respective neighbored connecting holes are orthogonally to each other. In the shown embodiment the diameters of the blind hole 25 and the diameter of the connecting holes 26 is bigger compared to a radial width 29 of the gap 24 and is bigger compared to the axial length of gap 16 as shown by FIG. 1.

As shown by the figures by means of the blind hole 25 and the connecting holes 26 it is provided a double (or multiple) passage area for the fluid (in the example preferably CNG) to reach the valve seat from the outside of the needle and through the central fuel hole (blind hole 25) from the inner of the needle 6. As mentioned above, FIG. 2 depicts the needle 6 as incorporated in the fluid injector 1 as shown by FIGS. 1, 1a and 1b. In the example the blind hole 25 and the four connecting holes 26 are connected to each other in a central region.

In FIG. 3, differing from the fluid injector 1 described before, the fluid injector 1 according to FIG. 3 includes in addition a second valve assembly 29 which is downstream to the first valve assembly 7. The second valve assembly 29 is of the outward opening type and is a passive valve assembly. The second valve assembly 29 includes a second valve seat 30 which adjoins a through-hole 31 and further includes a closing member 32 which is housed within the injector housing 2 and which is axially moveable relative to the injector housing 2 in a moving interval. The moving interval includes a closing position and an opening position of the closing member 32, so that when the closing member 32 is in its closing position (as shown by FIG. 3) the through-hole 31 is closed by the closing member 3 and when the closing member 32 is in its opening position the through-hole 31 is opened.

The second valve assembly 29 includes a second spring 33 for applying a force to the closing member 32 towards its closing position. Within the closing member 32 it is formed a valve chamber 34 of the second valve assembly 29 which is in fluid connection to the through-hole 10. If the fluid pressure within the valve chamber 34 exceeds a threshold value the force of the spring 33 is exceeded and the closing member 32 is moved away from the position in FIG. 3 towards its opening position.

FIG. 4 depicts a fluid injector 1' known in the prior art. The difference compared to FIG. 3 is that the needle 6' which is comprised by the fluid injector 1' of FIG. 4 does not include the blind hole 25 and the connecting holes 26 as described above.

FIGS. 5, 5a and 5b show another fluid injector 1' known from the prior art. The difference compared to the fluid injector 1 shown by FIGS. 1, 1a, 1b is that the needle 6' of FIG. 5 also does not include the blind hole 25 and the connecting holes 26.

In FIGS. 4, 5, 5a and 5b features which correspond to or are similar to features of FIGS. 1 to 3 are indicated by the same reference number, however by adding a "'".

Thus, in order to avoid repetitions, with regard to all concurring features FIGS. 4, 5, 5a and 5b are respectively described relating to FIGS. 1 to 3 by adding "'" to the reference numbers.

What is claimed is:

1. A fluid injector for direct injection or multi-point injection of compressed natural gas into a combustion chamber of a combustion engine, the fluid injector comprising:
   an injector housing defining a fluid path extending along a longitudinal direction from an injector inlet to an injector outlet; and
   a needle housed within the injector housing and axially movable relative to the injector housing within a moving interval including a closed position and an open position of the needle;
   wherein the needle comprises a cylindrical body with a first axial end, and a second axial end closer to the injector outlet, an end face on the second axial end, and an axial needle section circumferentially surrounded by the injector housing;
   a gap between the axial needle section and the surrounding injector housing, the gap comprising at least part of the fluid path;
   wherein the needle includes a first hole extending axially from the end face and terminating in the cylindrical body;
   the needle includes a connecting hole providing a transverse fluid connection between the first hole and the gap; and
   a plate defining a through-hole;
   wherein the plate is sealingly connected along an outer edge to an inside of the injector housing;
   a first valve seat is defined at a surface of the plate facing the end face and adjoining the through-hole; and
   when the needle is in the closed position the through-hole is sealingly closed by the end face and fluid flow along the fluid path, through the gap, through the connecting hole and into the first hole is open.

2. A fluid injector according to claim 1, wherein the axial needle section extends axially to the end face.

3. A fluid injector according to claim 1, wherein the surface of the plate and the end face are flat and coplanar.

4. A fluid injector according to claim 1, further comprising an elastomeric seal fixed to the end face of the needle.

5. A fluid injector according to claim 1, wherein the needle opens by moving inwardly.

6. A fluid injector according to claim 1, wherein the axial needle section and an axial end of the gap adjoin the end face.

7. A fluid injector according to claim 1, wherein the first hole extends parallel to a geometric longitudinal central axis of the needle and concentrically to the geometric longitudinal central axis.

8. A fluid injector according to claim 1, wherein the connecting hole extends radially to a centerline of the first hole and radially to a geometric longitudinal central axis of the needle.

9. A fluid injector according to claim 1, further comprising four connecting holes formed in the needle;
   wherein the four connecting holes are evenly distributed along a circumferential direction and the first hole is in fluid connection to the gap by each one of the connecting holes.

10. A fluid injector according to claim 1, wherein a diameter of the first hole and a diameter of the connecting hole is bigger than a radial width of the gap.

11. A fluid injector according to claim 1, further comprising a spring applying a force to the needle towards the closed position of the needle.

12. A fluid injector according to claim 1, further comprising an electrical actuator unit to actuate the needle towards the open position.

13. A fluid injector according to claim 12, wherein the electromagnetic actuator unit includes: a coil, a pole piece, and an armature;
- the coil and the pole piece are axially fixed to the injector housing; and
- the armature is axially fixed to the needle so that in the closed position of the needle an axial gap is defined between the armature and the pole piece and in the open position of the needle the armature contacts the pole piece.

14. A fluid injector according to claim 1, further comprising a second valve assembly mounted between the first valve assembly and the injector outlet;
- wherein the second valve assembly comprises an outward opening valve and/or a passive valve assembly.

* * * * *